United States Patent [19]

Lowry, Jr.

[11] 4,372,252
[45] Feb. 8, 1983

[54] FLOATING FISH FEEDER

[76] Inventor: Edward E. Lowry, Jr., P.O. Box 550, Greensboro, Ala. 36744

[21] Appl. No.: 294,558

[22] Filed: Aug. 20, 1981

[51] Int. Cl.³ .............................................. A01K 61/02
[52] U.S. Cl. .................................................. 119/51 R
[58] Field of Search .............. 119/51 R, 51.11, 3; 222/630; 406/164

[56] References Cited

U.S. PATENT DOCUMENTS 2,966,885  1/1961  Bentley ........................... 119/51 R
3,218,175  11/1965  Siegel et al. .................... 222/630 X
3,528,588  9/1970  Moore ........................... 119/51 R X
3,841,530  10/1974  Janninck ........................ 222/630 X

FOREIGN PATENT DOCUMENTS 648184  2/1979  U.S.S.R. ........................ 119/51 R

Primary Examiner—Robert P. Swiatek
Attorney, Agent, or Firm—Isaac P. Espy

[57] ABSTRACT

A self feeding floating fish feeder for distributing fish food on a body of water from a hopper on the bank of the impoundment.

2 Claims, 4 Drawing Figures

FLOATING FISH FEEDER

BACKGROUND OF THE INVENTION

This invention relates to the class of animal husbandry, and feeding devices for fish.

Fish farm production has increased dramatically in recent years, especially the growing of catfish in the southeastern states. Profitability of fish farming is dependent in part on the efficiency of a feeding system which distributes fish food in an even and fast manner. At least two systems for diffused feeding have been offered; patents to Evans, U.S. Pat. No. 3,523,520, and to Dils, et.al., U.S. Pat. No. 3,786,784. Evans disclosed a system of broadcasting by air from a tractor mounted device driven along the bank of the impoundment. However, it has a limited range and requires substantial equipment.

Dils, et.al., disclosed a conduit and diffused vane system where feed is entrained in moving air for distribution. This conduit system, however, is fixed, and does not cover a large area.

These and other systems require an operator to constantly monitor and move parts of the systems. Both systems mentioned are relatively shore-bound; that is, have a mechanical limitation as to how far the feed extends from the bank.

BRIEF SUMMARY OF THE INVENTION

My invention comprises a water borne feeding system wherein hoppered feed is forced by a water jet through a floating conduit onto the surface of the water. The conduit can be traversed angularly in an arc from the feeder for wide disbursement.

The hopper bottom is in the shape of an inverted cone. Water is pumped vertically downward through a pipe jet situated at the axis of the cone. The pipe jet terminates a short distance above the apex of the cone. The apex is slightly truncated to the size of and connected to the feeding conduit.

As the water jets through the short opening to the feeding conduit, it entrains pelletized feed and carries it out to the end of the feeding conduit on the surface of the lake. The feeding conduit rests on floats, and is swiveled at the hopper. Thus the conduit may be moved in an arc, covering a wide area.

The system can be filled and emptied manually, or a storage bin can be established above the hopper bottom for near automatic operation.

DETAILED DESCRIPTION OF THE PREFERRED EMBODIMENT OF THE INVENTION

Figure 1:
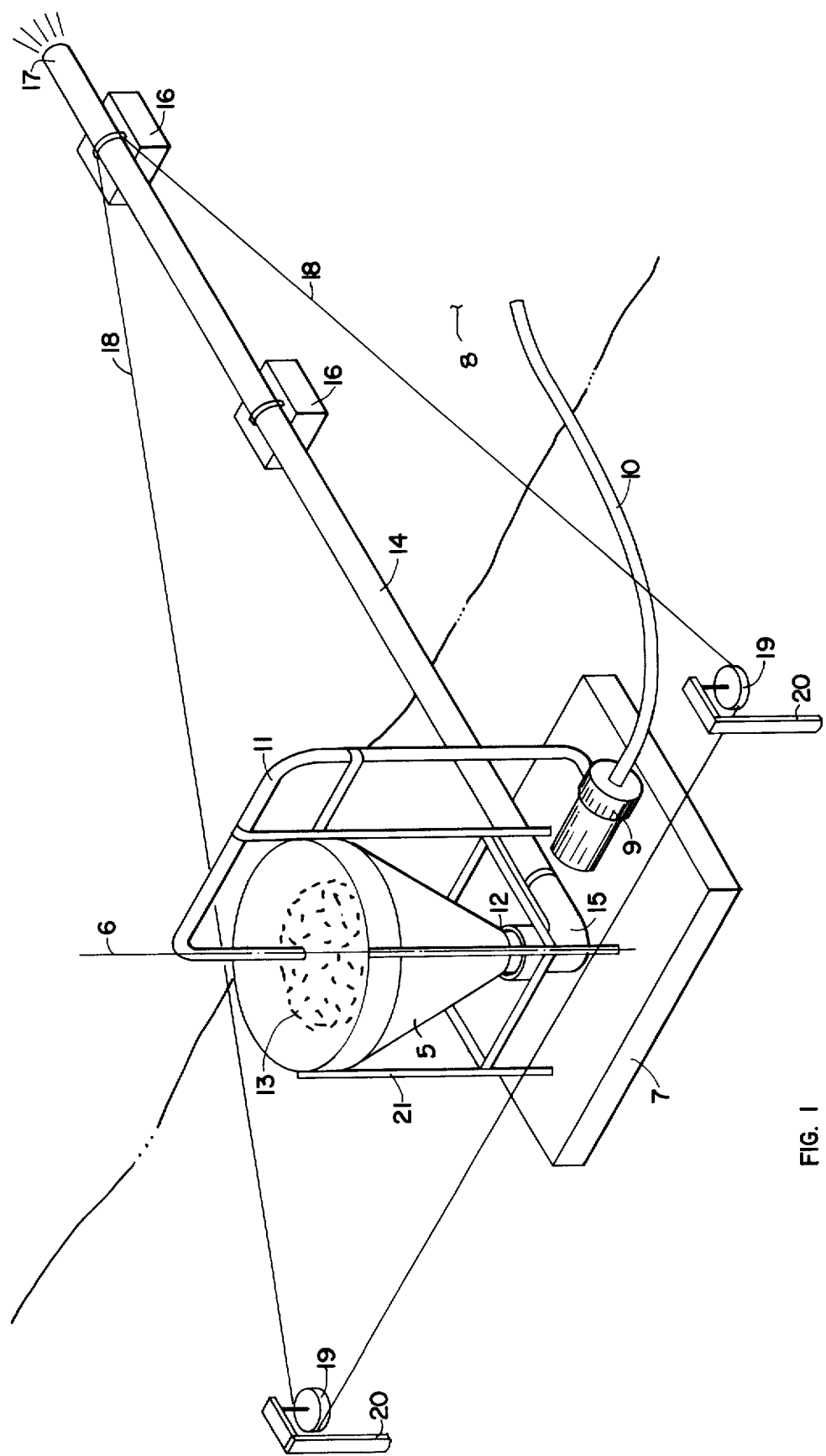
FIG. 1 is a perspective view of the Floating Fish Feeder.

FIG. 1 of the drawings illustrates the overall configuration of the Floating Fish Feeder. A hopper 5, preferably of the shape of the surface of an inverted cone, slightly truncated, is supported with its axis 6 vertical, on a base 7. It is mounted close to the edge of the water impoundment 8 where the fish are raised.

A pump 9 brings in water through a supply conduit 10, out of the impoundment 8, and forces the water at high velocity through a pipe jet 11, which is aligned vertically over the apex of the hopper and terminates slightly above the truncated apex 12 of the hopper (preferably 2-3 inches above). Feed 13 stored in the hopper 5 is entrained in the jet of water and forced through the feeding conduit 14, preferably made of polyvinyl-chloride, onto the surface of the impoundment.

The feeding conduit 14 is swiveled at an ell joint 15, and over the water, rests on floats 16. The jetted water with feed entrained, exits at the feeding conduit terminus 17, and sprays over the surface of the water.

The position of the terminus of the feeding conduit 14 can be varied by moving it in an arc around the swiveled ell joints 15. The position change is made, in one method, by pulling one of a set of continuous flexible lines 18 in the direction desired. The flexible lines 18 are attached to the end of the feeding conduit 14 and looped around pulleys 19 which are attached to stays 20 on the bank of the impoundment. This allows the feed to be spread over a wide area of the water.

The hopper 5 is rigidly supported, in the preferred manner by a series of rigid legs 21 fixed to the base 7.

In one size of the preferred embodiment a one horsepower centrifugal pump is used in connection with a hopper capable of holding 50 pounds of pelletized feed. In this arrangement, a pipe jet of one inches inside diameter is preferable.

In an automated version of my invention, a large storage bin is supported over the hopper, and the pump and storage bin outlet (located over the hopper) are controlled by an electrical timing device well known in the art.

Figure 2:
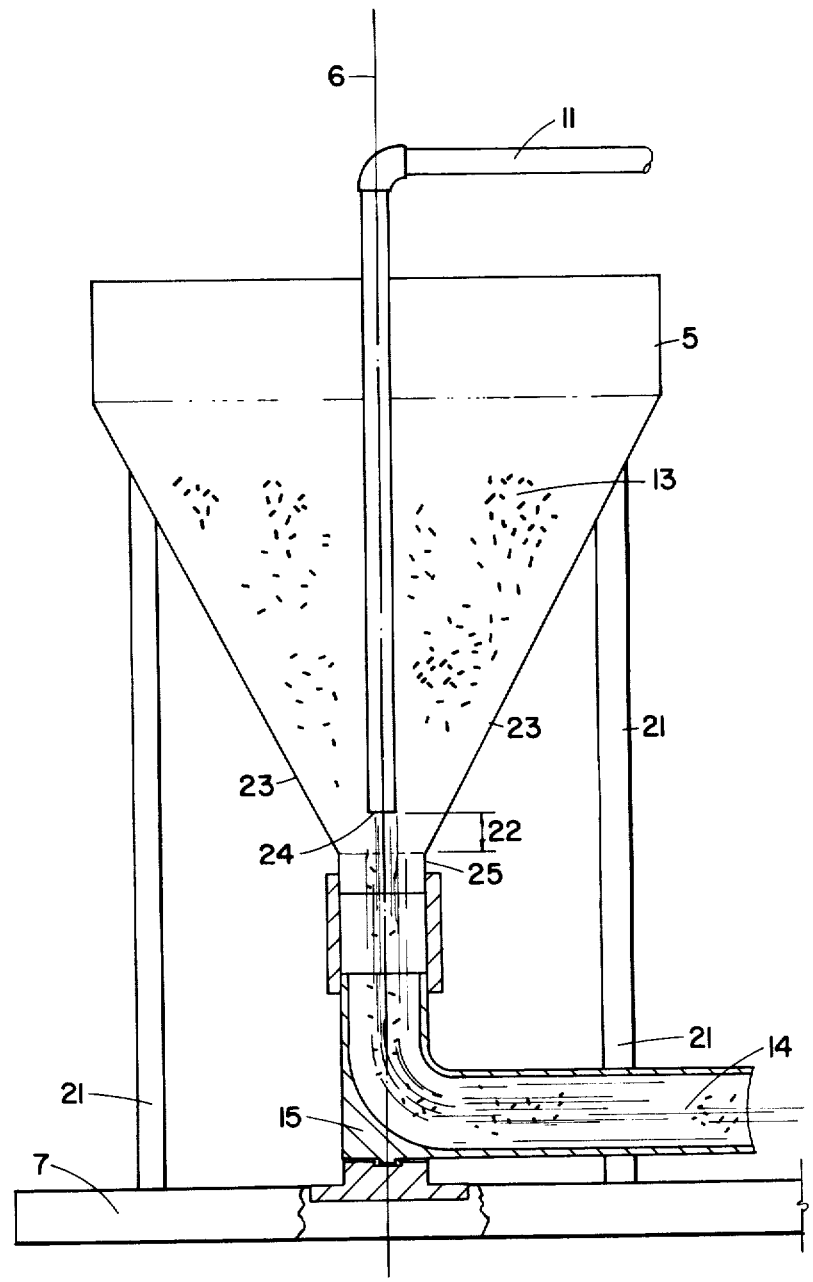
FIG. 2 is a cross-sectional view taken along a vertical plane through the axis of the Floating Fish Feeder hopper.

FIG. 2 is a cross-sectional view of the hopper of the invention, taken on a plane passed through the vertical axis 6 of FIG. 1. The features described in each figure retain the same identification numbers. The distance 22, preferably 2 to 3 inches in the 50 pound capacity model, can be varied in this and in other sizes in order to obtain the optimum entrainment of feed 13 to match the diameter of the pipe jet 11 and the power of the pump which forces the water through.

I have found that, when the velocity of the jet is sufficient to entrain the feed and broadcast it at the feeding conduit terminus, the feed is not in the water a sufficient length of time to disintegrate the pellets or make them so soggy that they immediately sink when they strike the water surface.

It is important that the hopper 5 have sides 23 of sufficient slope so that the feed flows by gravity to the region of the pipe jet nozzle 24. A true conical shape is not critical, and inverted pyramidical shapes are satisfactory. It is only necessary that the hopper have sides of sufficient slope downward and inward to and terminating at a slightly truncated apex compatible with and in the region of the pipe jet nozzle. In the preferred embodiment of the 50 pound capacity hopper, a side slope of twelve inches vertical to eight inches horizontal is satisfactory.

It is also to be understood that my invention can also be used to broadcast material such as lime or fertilizer, with adjustment of the entrainment distance 22. This material may be pelletized, granualized, or powdered.

In different applications, the nozzle 24 may need to be adjusted to conform to a diameter compatible with the orifice 25 diameter. In the 50 pound capacity an orifice of three inches in diameter, using a one inch diameter nozzle, works well.

Figure 3:
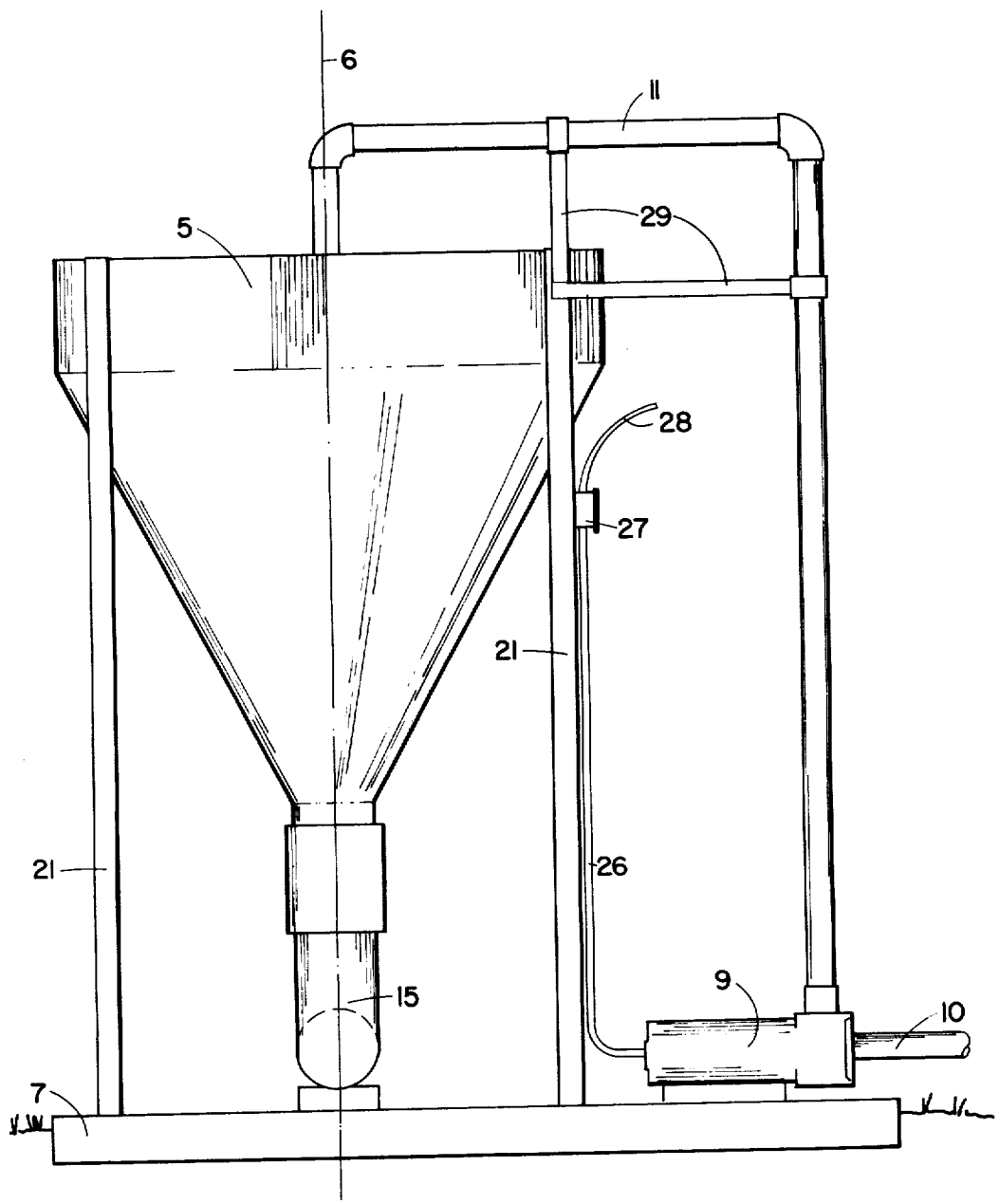
FIG. 3 is an elevation view of the Floating Fish Feeder hopper, its pump and pipe arrangement.

FIG. 3 is a partial elevational view of the invention. The pump 9 is shown with an all-weather electrical conduit 26 and switch 27 mounted on the support 21; and the electrical supply lines 28 leading away to the power supply. The pipe jet 11 is rigidly supported to the hopper supports 21 by rigid supports 29. The water intake pipe 10 leads to the supply side of the pump 9. It is also understood that water may be supplied from any source, such as a well or a municipal water supply, as long as there is sufficient capacity to direct water through the pipe jet with sufficient velocity to entrain the material in the hopper.

Figure 4:
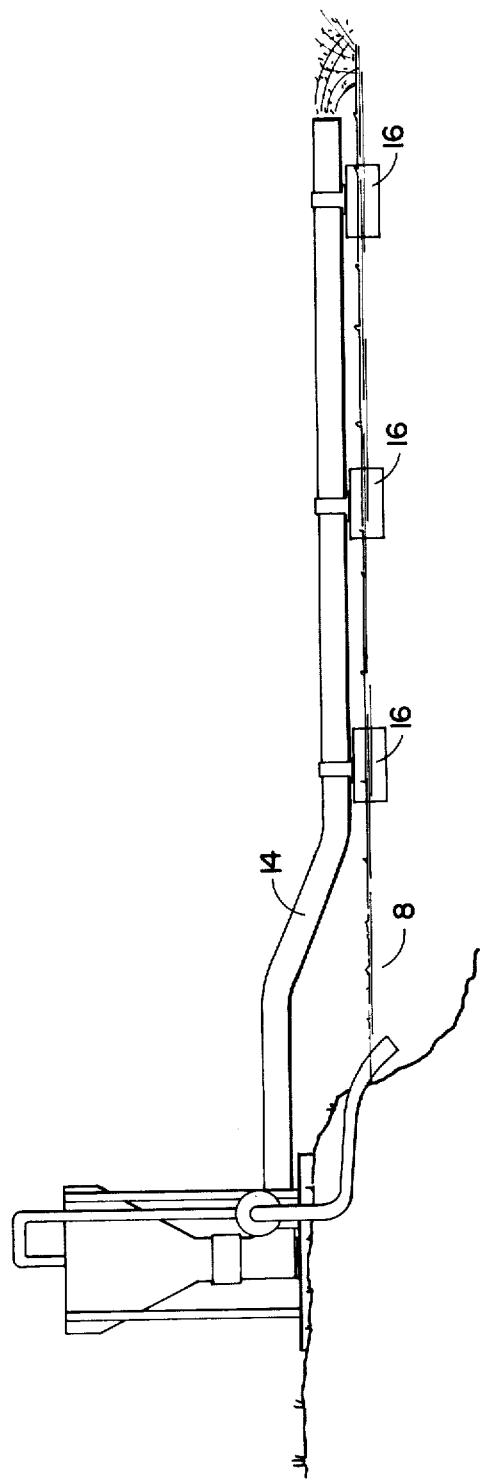
FIG. 4 is an elevation view of the Floating Fish Feeder hopper and feeding conduit on floats.

FIG. 4 is a smaller scale elevational view of my invention, omitting some details. The hopper is shown, preferably located on the impoundment bank just enough above the water line 8 to prevent flooding of the equipment. The floats 16, made of any buoyant material but, preferably made of styrofoam, are attached to and support the feeding conduit 14.

Having thus described my invention in part by reference to specific embodiments, but without limiting the same thereby.

What I claim is:

1. A device for broadcasting pelletized, granualized and powdered material over the surface of a water impoundment, comprising a hopper, a floating conduit, a pipe jet, and pumping means;

said hopper having sides sloping downward and inward to and terminating at a slightly truncated apex, said truncated apex connected to an ell joint, wherein said ell joint is swiveled about the vertical axis of said hopper;

said floating conduit comprising a conduit having floatation means attached thereto and spaced along its length; said conduit being attached to the lower end of said ell joint, and swiveled about the vertical axis of said hopper;

said pipe jet comprising a pipe, with a nozzle, which is aligned vertically over the truncated apex of the hopper, the nozzle of which terminates in the region of the truncated apex of the hopper; said pipe connected at its other end to said pumping means;

said pumping means comprising a supply conduit through which water is supplied in sufficient capacity to direct water through the pipe jet with sufficient velocity to entrain the material in the hopper;

wherein the material in the hopper is entrained in water at the region of the pipe jet nozzle and forced through the floating conduit and out its terminus over the surface of the water impoundment.

2. The invention of claim number 1 wherein said swiveled floating conduit is equipped with continuous flexible lines attached to the end of said swiveled floating conduit, and looped around pulleys attached to stays on a bank of the impoundment, wherein the terminus of said swiveled floating conduit is moved in an arc around said swiveled ell joint.

* * * * *